UNITED STATES PATENT OFFICE.

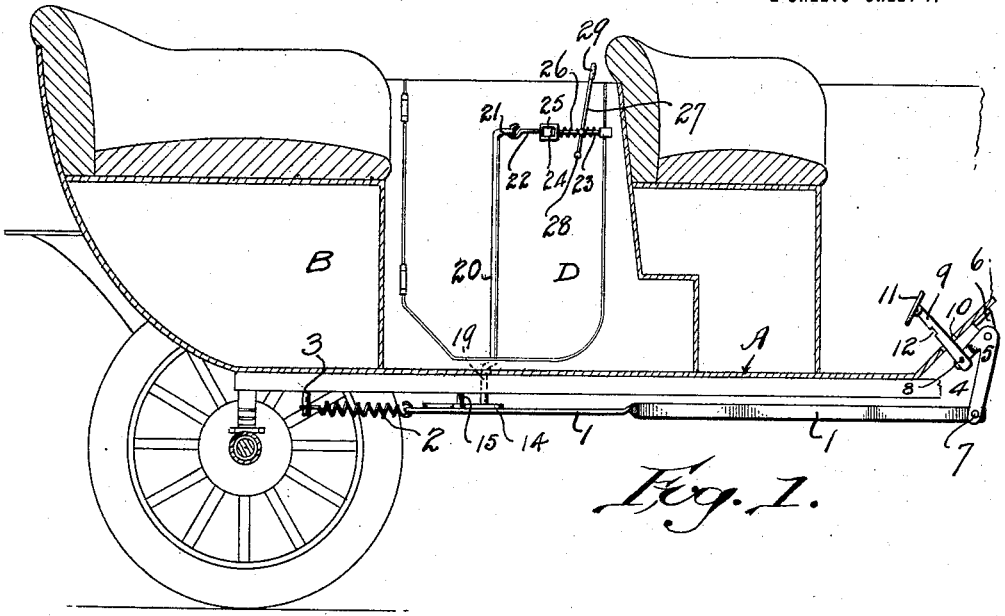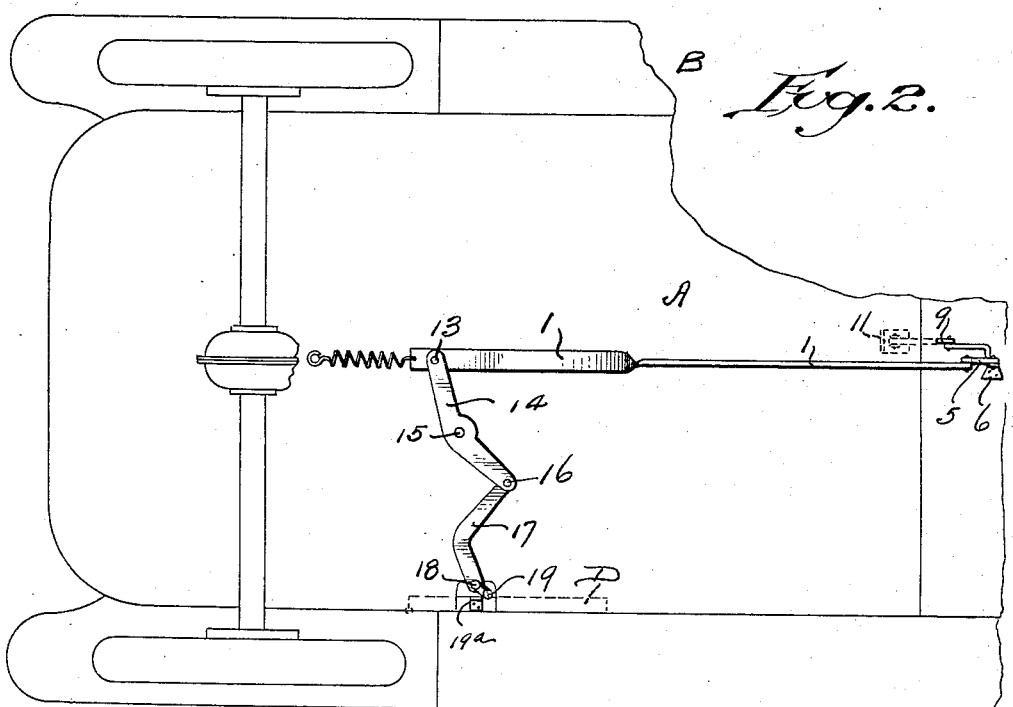

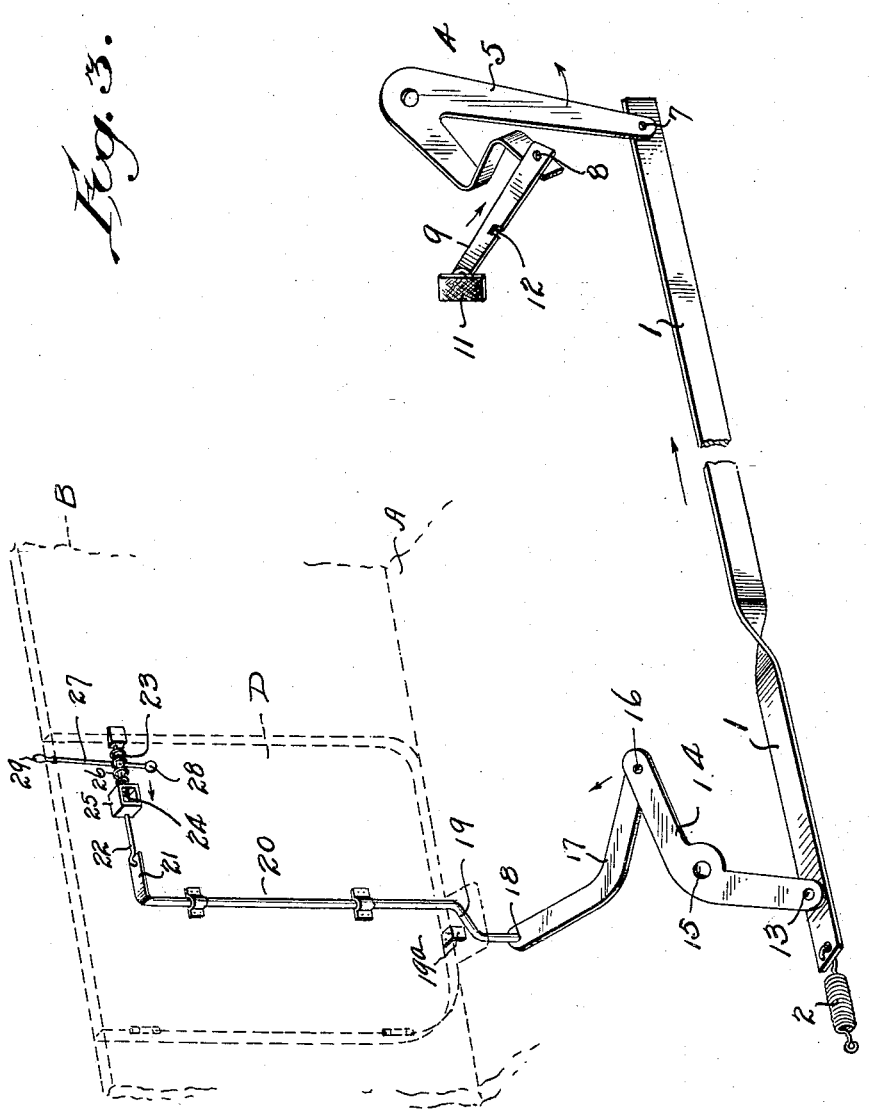

PATRICK J. BARRETT, OF YOUNGSTOWN, OHIO, ASSIGNOR OF ONE-FOURTH TO GEORGE J. BURNS, ONE-FOURTH TO ROBERT U. CANTWELL, AND ONE-FOURTH TO PATRICK J. SCANLON.

DOOR-OPENER.

1,177,471. Specification of Letters Patent. Patented Mar. 28, 1916.

Application filed April 28, 1915. Serial No. 24,582.

*To all whom it may concern:*

Be it known that I, PATRICK J. BARRETT, a citizen of the United States, residing at Youngstown, in the county of Mahoning and State of Ohio, have invented certain new and useful Improvements in Door-Openers, of which the following is a specification.

This invention relates to door openers, and more particularly to a device of this character especially adapted to automatically open and close an automobile door.

Primarily, the invention contemplates a novel and practical device that both unlatches the door and swings the same to an open position and which may be easily controlled by the driver of the car through the medium of a foot lever and novel intermediate connections. Furthermore, while providing means for automatically unlatching and opening the door, the invention also permits the same to be opened by hand in the ordinary way, if desired.

A further object of the invention is to provide a simple and substantial construction that is positive and reliable in its action, and which is easy and convenient to operate.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a longitudinal sectional view showing a portion of an automobile with the present invention applied thereto. Fig. 2 is a bottom plan view of the construction shown in Fig. 1. Fig. 3 is a perspective view of the entire mechanism forming the subject of the invention.

Similar reference characters designate corresponding parts throughout the several figures of the drawings.

In the embodiment disclosed in the accompanying drawings, it will be observed that the door actuating instrumentalities are preferably arranged on the underside of the floor A of the car body B, and essentially comprise a main operating bar 1 which is arranged longitudinally of the car, and has attached to one end a suitable retracting spring 2 fastened as at 3 to the car body, and which serves to maintain the main operating bar in its normal position.

For the purpose of actuating the bar 1, there is preferably arranged at the front of the car, adjacent the driver's seat, a bar shifting device designated in its entirety by the reference 4. This device includes a main operating bell crank 5 pivotally suspended from the underside of the car body by means of a bracket 6 and having one arm thereof connected, as at 7, with the main operating bar 1. The other arm of the said bell crank 5 is pivotally connected, as at 8, to a foot lever 9 projecting through an opening 10 in the floor A of the car, and having a foot pedal 11. It will be apparent that the main operating bar 1 is shifted by the movement of the foot-operated bell crank 5, and to facilitate holding the operating bar, and its attached parts, in the position they assume upon the depression of the foot lever 9, the latter may be provided in one side thereof with a holding notch 12 engaging one edge of the opening 10.

The end of the main operating bar 1 adjacent the spring 2 is pivotally connected as at 13 with an intermediate bell crank lever 14 pivotally secured to the underside of the car body by the central pivot 15. This lever 14 is joined as at 16 with a link member 17 which loosely receives one end 18 of the crank portion 19 of a door control rod 20.

The door control rod 20 is carried by the door D, and is provided at its upper end with an angularly disposed arm member 21 connecting with a link 22 of the door unlatching means. This door unlatching means essentially comprises a sliding bolt 23 having the usual latch portion at one end and a button head 24 at the other end, which is slidably engaged by a rectangular frame member 25, that is also connected with the link 22. For the purpose of maintaining the sliding bolt 23 in its normal position, a spring 26 is interposed between one end of the rectangular frame 25 and the latch end of the bolt.

The foregoing features of construction more particularly relate to the automatic means for unlatching the door prior to its opening. However, to provide for opening the door in the usual manner by hand, a lever 27 is preferably pivoted to the door as at 28 and connected with the sliding bolt 23 in such manner that the handle 29 thereof which projects above the top of the door may be conveniently manipulated in the ordinary way to withdraw the latch end of the bolt from the keeper in the door case. When the latch is thus operated, it will be understood that the button head 24 will reciprocate within the rectangular frame 25, and in no way affect the position or relation of the other parts connected with the frame.

By reference to Fig. 3 the manner of operating the invention will be readily apparent. It will be observed that when the foot lever 9 is depressed, the bell crank 5 will swing in the direction of the arrow and pull the main operating bar forward against the tension of the spring 2, and in so doing will impart a lateral movement to the link member 17 through the medium of the bell crank 14. This lateral movement of the link member 17 will rotate the door control rod 20 because of its connection with the crank portion 19 thereof, thus swinging the arm member 21 so that it will exert a pull upon the link 22 and move the frame 25 in the direction of the arrow in Fig. 3 to withdraw the latch end of the sliding bolt 23 from its keeper in the door case. To prevent the rod 20 from rotating further after it has effected the release of the latch a stop lug 19ª may be attached to the inside of the door D. It will thus be apparent that the initial movement of the main operating bar 1 and its various connections with the rod 20 serves to unlatch the door. Upon a continued movement of the main operating bar, a further lateral movement will be imparted to the link 17, and since the crank portion 19 will strike against the abutment 19ª, the door D will be forced outward. The door may be held in its open position by the notch 12 on the lever 9 engaging with the edge of the opening 10. When it is desired to close the door automatically, it is only necessary to release the lever 9 from its engagement with the edge of the opening 10, and the spring 2 will exert sufficient force to automatically close the door, and the parts are returned to their normal position ready for the next operation.

While for the sake of clearness and simplicity only one door is shown as being connected with the door opening mechanism, it will of course be understood that the connections between the main operating bar 1 and the door opening rod may be duplicated on the opposite side of the bar to open the opposite door.

From the foregoing description, it is thought that the many features and advantages of the invention will be readily apparent, and it will of course be understood that minor details of construction may be resorted to without departing from the spirit of the invention or sacrificing any advantages of the appended claims.

I claim:

1. A door opener including in combination with the door and its latch, a main operating bar having a spring at one end for retaining the same in normal position, a foot actuated bell crank pivotally connected to the other end of said bar and adapted to move the same longitudinally, a door opening rod having an operative connection with said latch at its upper end, and a crank portion at its lower end, and extensible connections between the main operating rod comprising a bell crank having one end pivotally connected with the bar, and a link having one end pivotally connected with the bell crank, and the other end loosely connected with the crank portion of the door operating rod.

2. A door opener including in combination with the door and its latch, a spring-held main operating bar, a foot actuated bell crank lever for longitudinally moving said bar, a door opening rod operatively connected with the latch at its upper end, and having an angular crank portion at its lower end, and extensible connections comprising a bell crank lever and a link operating in a horizontal plane for connecting said bar and crank portion of the door opening rod.

3. A door opener including in combination with a door and its latch, a main operating element comprising a longitudinally shiftable operating bar connected at one end with a spring for retaining the same in normal position and connected at its other end with a foot lever operating device, and a vertically arranged door opening rod having a crank portion at one end and an arm member at its other end, means for releasing said latch connected with the arm member of said opening rod, and extensible lever connections operating in a horizontal plane between said main operating bar and the crank portion of the door opening rod.

4. A door opener including in combination with a door and its latch, a main longitudinally shiftable operating bar connected at one end with a spring, means for operating said bar including a bell crank, and a foot lever connected with said bell crank, and a vertically arranged door opening rod having a crank portion at one end and an angularly disposed arm member at the other, means controlled by said door opening rod for releasing the latch on the door, and extensible lever connections operating in a horizontal plane between said main operating bar and the crank portion of the door opening rod.

In testimony whereof I hereunto affix my signature in the presence of two witnesses.

PATRICK J. BARRETT.

Witnesses:
AGNES A. JOHNSTON,
DAVID STEINER.